United States Patent Office 3,715,431
Patented Feb. 6, 1973

3,715,431
PARASITICIDE FOR ANIMALS
Yasushi Yusa, Yokohama-shi, Naotoshi Akai, Kokubunji-shi, Shinichi Kondo, Yokohama-shi, Kimio Satoh, Kawasaki-shi, and Yasuharu Sekizawa, Tokyo, Japan, assignors to Meiji Seika Kaisha, Ltd., Tokyo, Japan
No Drawing. Filed July 7, 1967, Ser. No. 651,713
Claims priority, application Japan, July 8, 1966, 41/44,178; Mar. 10, 1967, 42/14,717
Int. Cl. A61k 21/00
U.S. Cl. 424—181       5 Claims

ABSTRACT OF THE DISCLOSURE

Parasiticide for animals which is mixed in a fodder and contains as an active ingredient a new antibiotic destomycin A which is produced by cultivation of Streptomyces rimofaciens deposited under ATCC No. 21066.

---

The present invention relates to parasiticides for animals, in particular to the parasiticide for animals containing a new antibiotic destomycin A as an active ingredient.

It was commonly well known that in the body of domestic animals there exist several parasites which exert a harmful influence upon the growth of the domestic animals and cause bleeding of the domestic animals.

As the result of our numerous searches for antibiotics which exhibit anthelmintic activity we have found that the antibiotic destomycin A which is produced by culture of Streptomyces rimofaciens or its variant exhibits excellent effectiveness for stamping out parasites in the body of the domestic animals. The present invention is based upon the above discovery.

Streptomyces rimofaciens is a new strain which was isolated by the inventors from a soil sample collected at Mitsuike park, Tsurumi-ku, Yokohama city and has been deposited in American Type Culture Collection under the ATCC Number 21066.

Destomycin A is accumulated mainly in the cultured broth by culture of above mentioned strain in a liquid culture medium of pHS 6–9 containing nutrients such as carbon sources, organic and inorganic nitrogen sources and the like which are usually utilized for producing the known antibiotics, at a temperature of 27°–28° C. for 2–4 days under submerged aeration condition.

To recover destomycin A from the cultured broth many means which are generally applied on the known antibiotics may be employed. The destomycin A may be extracted and recovered in the highest yield from the cultured broth by adsorption and elution with ion exchange resin, particularly cation exchange resin of carboxylic acid type.

The new antibiotic destomycin A is white crystals and decomposes gradually at 180°–190° C. The elemental analysis of destomycin A is as follows: C, 44.70%, H: 7.42%, N: 7.73%, O: 39.41%, N-CH$_3$: 3.06%, amino N: 4.67%. (Anal. calcd. for $C_{20}H_{37}N_3O_{13} \cdot H_2O$; C: 44.03%, H: 7.21%, N: 7.70%, O: 41.06%, N-CH$_3$(1): 2.76%, amino N(2); 5.14%, molecular weight; 545,536).

The titration equivalent measured in an aqueous solution is 182. The optical rotation is $[\alpha]_D^{22} = +7°$ (C2, in water). The ultraviolet absorption spectrum (in an aqueous solution) does not show characteristic absorption at 210–400 m$\mu$. but shows only end absorption. Destomycin A is soluble in water and lower alcohols and hardly soluble or insoluble in common organic solvents. The $R_f$ value of the destomycin A when chromatographed on a filter paper is 0 by using water-saturated n-butanol, 0.96 by 1.5% aqueous ammonium chloride solution, 0.07 by phenol-water (3:1), 0.07 by acetone-water (1:1), 0.04 by n-butanol-methanol-water (4:1:2), 0 by benzene-methanol (4:1), 0.20 by t-butanol-acetic acid-water (2:1:1), 0.55–0.62 by 80% aqueous methanol containing 1.5% sodium chloride and gives only one spot respectively. $R_f$ value by thin layer chromatography on active carbon using methanol:½ N sulfuric acid (1:4) as a solvent gives single spots at 0.50–0.53 when bioautographed.

Destomycin A gives positive reaction to ninhydrin, anthrone, Ehrlich reaction and after hydrolysis, red tetrazolium reaction.

5-methyl-β-naphthalene sulfonate of destomycin A is white needle crystals and decomposes at 186°–189° C. The elemental analysis is as follows: C: 51.67%, H: 6.21%, N: 3.52%, S: 7.49%, O: 30.63%. (Anal. calcd. for $C_{20}H_{37}N_3O_{13} \cdot 3(C_{11}H_{10}SO_3) \cdot H_2O$; C: 52.55%, H: 5.74%, N: 3.47%, S: 7.94%, O: 30.36%.)

Destomycin A reacts in methanol with acetic anhydride to give white crystals of N-acetyl destomycin A which decomposes gradually at 240°–260° C. The elemental analysis as follow: C: 46.36%, H: 7.11%, N: 6.14%, O: 39.39%. (Anal. calcd. for

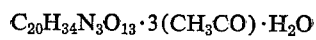

C: 46.49%, H: 6.75%, N: 6.2%, O: 40.50%.)

When destomycin A is hydrolysed with hydrochloric acid or sulfuric acid, three main decomposition products may be obtained. The first-product is $C_7H_{16}N_2O_3$ which is a derivative of deoxystreptamine and which has one amino and one N-methyl group. The optical rotation is $[\alpha]_D^{25} = -18°$ (C2, H$_2$O). It is differentiated from a decomposition product of hygromycin B hyosamine

(hydrochloride: $[\alpha]_D^{25} = +10.7°$, Journal of Organic Chemistry, 27, 2793, 1962). The second product is D-talose as in hygromycin B and the third product is a kind of amino acid, molecular formula of which is $C_7H_{15}NO_7$.

As the result of our structural study, we have determined the chemical structure of destomycin A as 5-O-[2′, [2′,3′-O-{3″,4″,5″-trihydroxy-6″-(1‴-amino-2‴-hydroxymethyl)-tetrahydropyran - 2″ - ylidene}-β-D-talopyranosyl] - 1 - methylamino-3-amino-1,2,3-trideoxymyo-inositol- ($C_{20}H_{37}N_3O_{13}$).

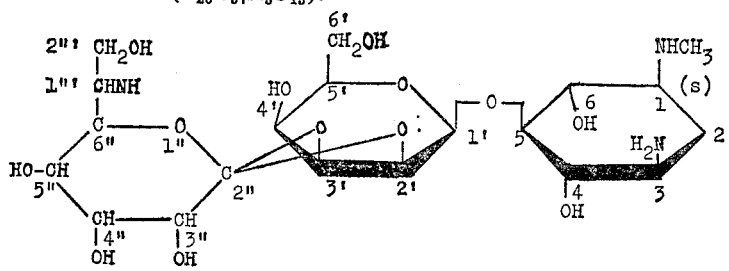

Destomycin A which is an active ingredient of the parasiticide for animals of this invention may be perorally administered. In this case, destomycin A may be administered in its original powder form as it is or destomycin A is mixed in advance with suitable fodder material such as soybean meal, bran and just on administration the mixture will be compounded in the fodder.

The amount of destomycin A to be mixed with the fodder is preferably 1–50 g. per one ton of the fodder. If the fodder containing destomycin A in above mentioned proportion will be daily administered to the domestic animals it is observed that the numbers of the parasite eggs in the excrement gradually decrease and finally become nil or almost nil. However, no change is noticed on gain of the weight of the body, intake amount of the fodder, breeding rate and the like and no other secondary actions are observed.

The anthelmintic activity of destomyin A will be shown by way of the following experimental examples.

EXPERIMENTAL EXAMPLE 1

The fodder mixed uniformly with destomycin A in the rate of 10 g. per one ton of the former was daily administered to seven head of about three-month-old pigs on which *Ascaris suilla* and *Trichuris suis* being parasitic. The excrements from each pig were collected just before administration and on each 10th day, 20th day, 30th day, 40th day and 60th day after administration and the numbers of parasite eggs in 1 g. of the excrement were measured by Stoll's method. The measured results were shown in the following table from which the anthelmintic activity could be confirmed. In addition, the increase of the weight of the body and intake amount of the fodder were normal and no other secondary actions were observed.

EXAMPLE 3

Recovery of destomycin A from *Streptomyces rimofaciens*

*Streptomyces rimofaciens* cultured on a glucose-asparagine agar slant medium was inoculated to a liquid medium (pH 7.0) containing 2% glucose, 1% peptone, 0.3% meat extract, 0.05% $K_2HPO_4$ and cultured at 28° C. for 48 hours under submerged aeration condition to give a seed culture. 5% of said seed culture was inoculated to 12 l. of a liquid medium (pH 7.2), containing 2.5% glucose, 3.5% soybean meal, 0.5% soluble vegetative protein, 0.25% table salt and 0.4% soybean oil, in a 20 l. volume glass fermentor and cultured at 28° C. for 65 hours under submerged aeration condition. The cultured medium was filtered using "Hyflo supercel" (Johns-Manville Corp.) as a filter-aid to give 9.5 l. of filtrate (pH 6.4, 450 $\mu$/ml.) The filtrate was applied to a column filled with 300 ml. of Amberlite IRC 50 ($NH_4^+$ type) (Rohm & Haas Co. cation exchange resin of carboxylic acid type). The column was washed with water and eluted with 2% aqueous ammonia. The 300 ml. of the active elute was concentrated under reduced pressure to dryness to give a crude brown powder (400 $\mu$/mg.). 2.2 g. of the powder was dissolved in 10 ml. of water and applied to a column filled with 80 ml. of Dowex 1X2 ($OH^-$ type) (50–100 mesh, anion exchange resin, Dow Chemicals Incorp.) and developed with water. The eluate was fractionated to each 10 ml. Destomycin A was eluted in 15–24th tubes.

| | Numbers of parasite eggs discharged | | | | | | | | | | | |
|---|---|---|---|---|---|---|---|---|---|---|---|---|
| | Before administration | | 10th day | | 20th day | | 30th day | | 40th day | | 60th day | |
| No. of pigs | ASE | TSE | ASE | TSE | ASE | TSE | ASE | TSE | ASE | TSE | ASE | TSE |
| 1 | 5,600 | 9,600 | 6,600 | 4,800 | 1,800 | 200 | 400 | 200 | 0 | 100 | 0 | 0 |
| 2 | 400 | 1,400 | 1,000 | 200 | 400 | 0 | 100 | 0 | 0 | 0 | 0 | 0 |
| 3 | 1,200 | 0 | 400 | 0 | 0 | 0 | 0 | 0 | 0 | 0 | 0 | 0 |
| 4 | 2,300 | 1,200 | 1,800 | 1,000 | 500 | 500 | 100 | 200 | 100 | 200 | 100 | 0 |
| 5 | 4,100 | 5,000 | 4,000 | 5,200 | 1,000 | 2,600 | 500 | 1,600 | 0 | 200 | 0 | 100 |
| 6 | 0 | 2,100 | 0 | 2,000 | 0 | 400 | 0 | 100 | 0 | 100 | 0 | 0 |
| 7 | 3,600 | 0 | 2,000 | 0 | 400 | 0 | 200 | 0 | 100 | 0 | 0 | 0 |

NOTE.—ASE: *Ascaris suilla* egg; TSE: *Trichuris suis*.

EXPERIMENTAL EXAMPLE 2

The fodder mixed uniformly with destomycin A in the rate of 12 g. per one ton of the former was daily administered to five breeding hens on which *Ascaris galli* being parasitic. The crements from each hens were collected just before administration and on each 2nd week, 4th week, 6th week and 10th week after administration and the numbers of parasite eggs in 1 g. of the crement were measured by Stoll's method. The measured results were shown in the following table. Further no residual *Ascaris galli* in the small intestine of the five hens slaughtered after 10th week experiment was observed. From this experiment the anthelmintic activity of destomycin A could be confirmed. In addition, the breeding rate and intake amount of the fodder were normal and no other secondary actions were observed.

| | Numbers of parasite eggs discharged | | | | |
|---|---|---|---|---|---|
| No. of hens | Before administration | 2nd week | 4th week | 6th week | 10th week |
| 1 | 1,100 | 500 | 0 | 0 | 0 |
| 2 | 800 | 200 | 200 | 0 | 0 |
| 3 | 1,500 | 800 | 100 | 100 | 0 |
| 4 | 1,900 | 1,000 | 200 | 0 | 0 |
| 5 | 2,300 | 1,100 | 0 | 0 | 0 |

The 16–20th fractions of destomycin A were combined and lyophilized to give white powder of destomycin A. The fractions of destomycin A were combined and applied to a column filled with 5 g. of active carbon, washed with 200 ml. of water and eluted with $\frac{1}{5}$ N sulfuric acid. The active eluate was adjusted to pH 4.0 with Amberlite IR 45 ($OH^-$ type) and lyophilized to give 330 mg. of white powder (890 $\mu$/mg.) of destomycin A sulfate. Yield was 61 mg. per 1 l. of the cultured filtrate.

We claim:

1. An anthelmintic process for decreasing parasites in domestic animals comprising feeding a mixture of destomycin A in an amount between 1–50 gm. per ton of fodder to said animals.

2. The process of claim 1 wherein the fodder is fed to the animals up to 60 days.

3. The process of claim 1 wherein the amount of destomycin A mixed with the fodder is 10 g. per ton of fodder.

4. The process of claim 1 wherein said parasites are *Ascaris suilla*, *Trichuris suis* or *Ascaridia galli*.

5. The process of claim 4 wherein said animals are hens or pigs.

References Cited

Kondo et al., J. of Antibiotics, Ser. A, XVIII–I, January, 1965, pp. 38–42.

Goldberg: Antibiotics, D. Van Nostrand Co., Inc., Princeton, N.J., 1960, pp. 178–9.

JEROME D. GOLDBERG, Primary Examiner